Jan. 15, 1952     I. J. CAPIAK     2,582,858
MOTOR PROPELLED SNOW SLED
Filed June 2, 1948     3 Sheets-Sheet 1
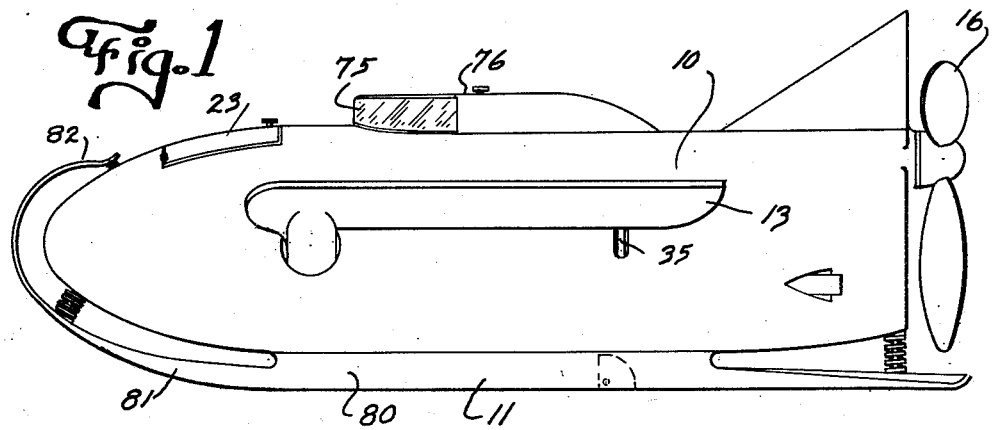
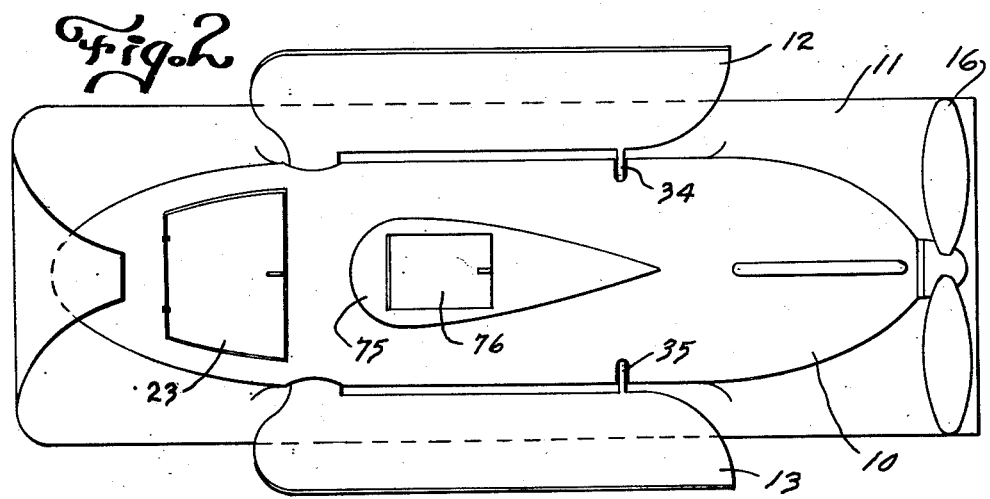
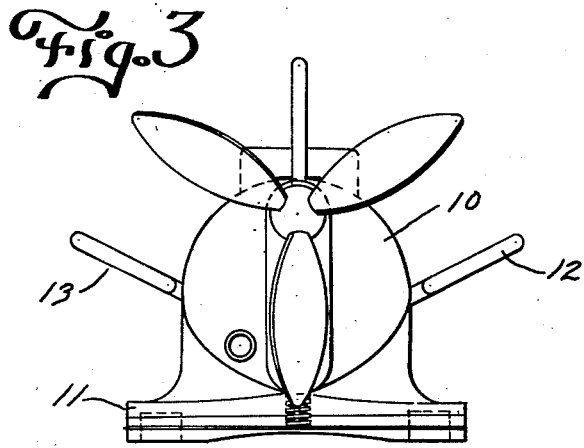
INVENTOR.
Ignatius James Capiak
BY Victor J. Evans & Co.
ATTORNEYS Jan. 15, 1952  I. J. CAPIAK  2,582,858
MOTOR PROPELLED SNOW SLED
Filed June 2, 1948  3 Sheets-Sheet 2
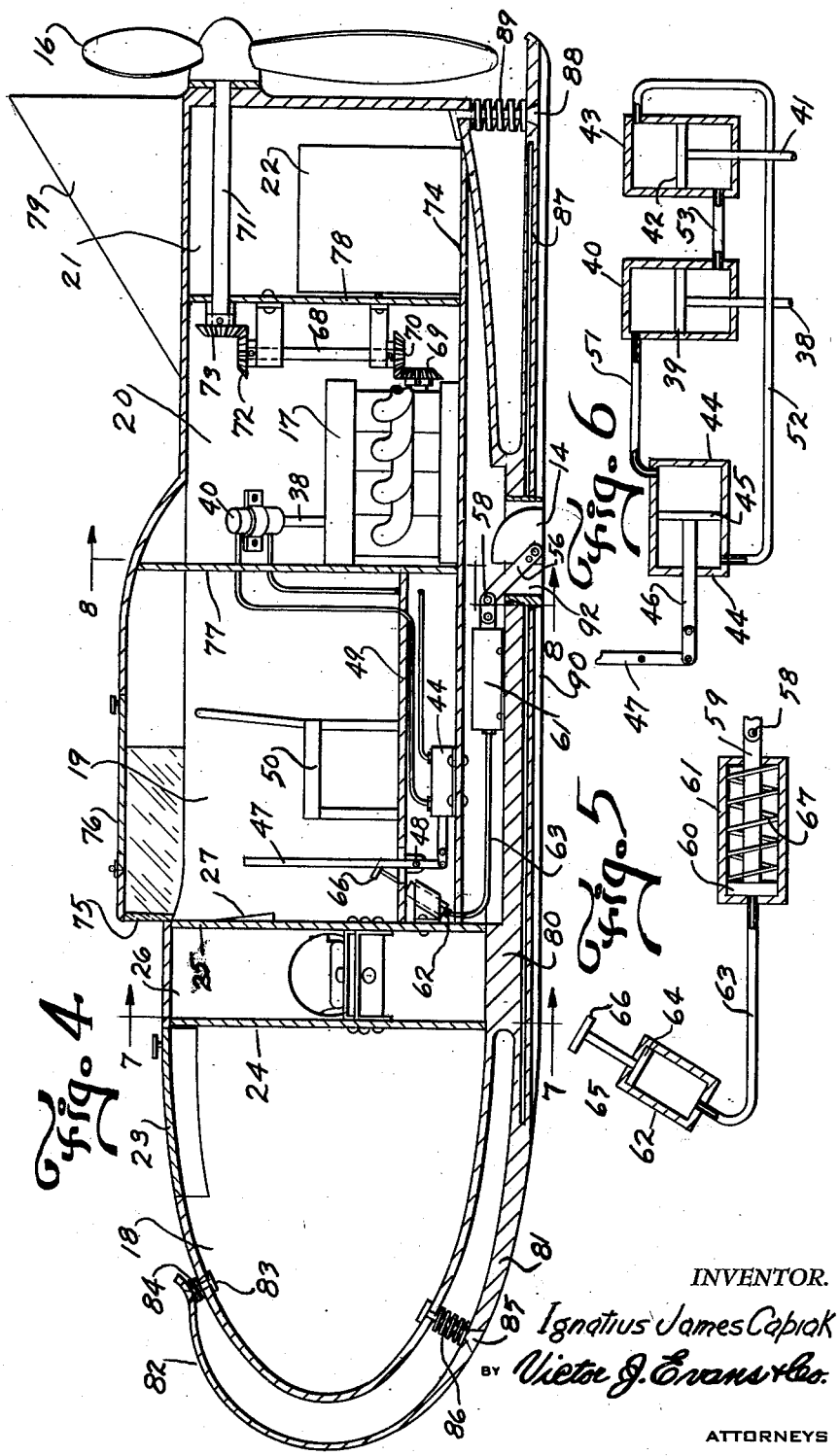
INVENTOR.
Ignatius James Capiak
BY Victor J. Evans & Co.
ATTORNEYS Jan. 15, 1952 I. J. CAPIAK 2,582,858
MOTOR PROPELLED SNOW SLED
Filed June 2, 1948 3 Sheets-Sheet 3
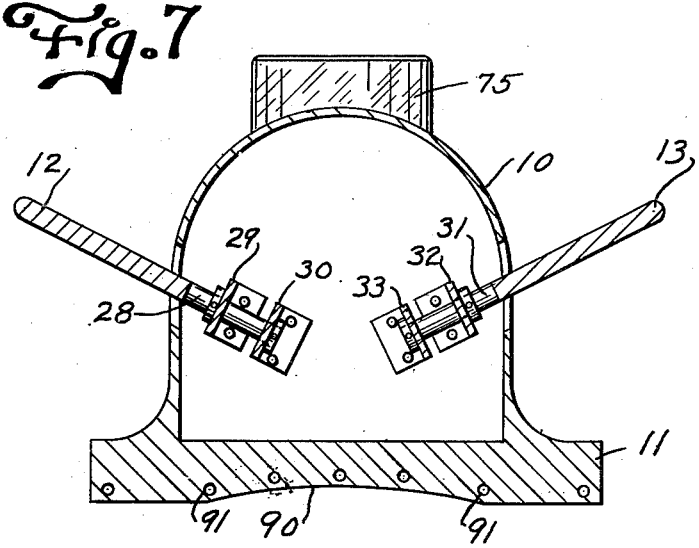
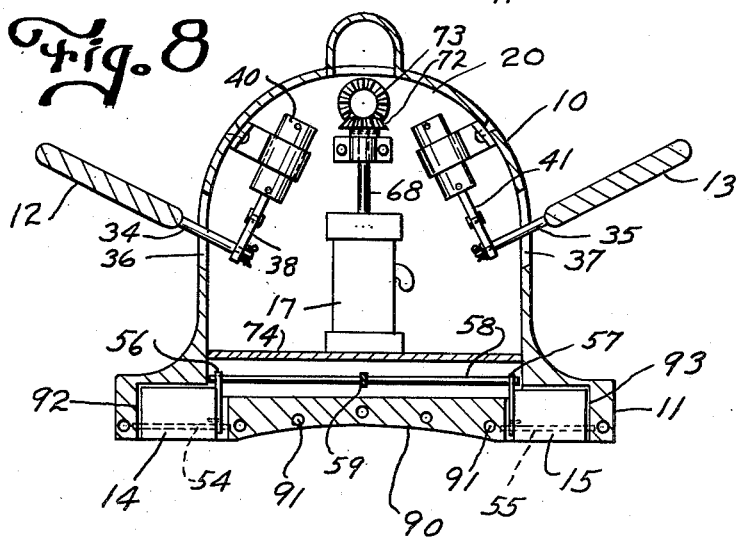
INVENTOR.
Ignatius James Capiak
BY Victor J. Evans & Co.
ATTORNEYS Patented Jan. 15, 1952

2,582,858

UNITED STATES PATENT OFFICE 2,582,858

MOTOR PROPELLED SNOW SLED

Ignatius James Capiak, Chicago, Ill.

Application June 2, 1948, Serial No. 30,559

4 Claims. (Cl. 180—3)

This invention relates to motor propelled snow sleds for use in transportation, exploring, and outdoor sports in snow covered areas, and in particular a snow sled having a body with a plurality of compartments therein mounted on a continuous runner with a springy arcuate forward end and having a motor with a propeller driven by the motor, steering wing flaps at the sides, and a brake.

The purpose of this invention is to provide a motor propelled snow sled for transportation, cargo hauling, sports and the like which is adapted to acquire considerable speed and which is also adapted to travel on deep snow.

Various devices have been provided for traveling on snow and ice but owing to the fact that snow paths are formed by nature they are not smooth or even and devices of this nature are subjected to considerable abuse. With this thought in mind this invention contemplates a motor propelled snow sled having a relatively wide and sturdy runner with springy sections at the front and rear and with a streamlined body rigidly mounted thereon wherein passengers and cargo may be carried in the body with safety.

The object of this invention is, therefore, to provide means for constructing a motor propelled snow sled so that the parts are compact and sturdy and adapted for high speed over rough terrain.

Another object of the invention is to provide means for steering a high speed motor propelled snow sled by wing flaps at the sides that are spaced above the runner.

Another object of the invention is to provide steering and braking means for high speed motor propelled snow sleds which is hydraulically controlled.

A further object of the invention is to provide a low-slung high speed motor propelled snow sled that is of the rugged type which is of a simple and economical construction.

With these and other objects and advantages in view the invention consists of the new and useful combination, construction, and arrangement of parts as hereinafter more fully described, set forth in the claims appended hereto and disclosed in the accompanying drawings forming part hereof, wherein:

Figure 1 is a view showing a side elevation of the snow sled.

Figure 2 is a plan view of the snow sled.

Figure 3 is a view showing a rear elevation of the snow sled.

Figure 4 is a vertical longitudinal section through the snow sled illustrating the relative positions of the parts.

Figure 5 is a detail showing the hydraulic brake actuating parts.

Figure 6 is a similar view illustrating the hydraulic cylinders for actuating the steering flaps or wings.

Figure 7 is a cross section through the snow sled taken on line 7—7 of Figure 4 showing the steering flap journals.

Figure 8 is a similar section taken on line 8—8 of Figure 4 illustrating the hydraulic steering flap control connections.

Referring now to the drawings wherein like reference characters denote corresponding parts the high speed fluid actuated motor propelled snow sled of this invention includes a body 10 resembling the fuselage of an airship, a runner 11, steering flaps or wings 12 and 13, brakes 14 and 15, and a propeller 16 driven by a motor 17.

The body 10 is substantially streamlined and the interior is divided into compartments with a compartment 18 in the forward end for luggage and the like, a compartment 19 for an operator and passengers, a compartment 20 for the motor 17, and a compartment 21 for a fuel tank 22. The compartment 18 is provided with a door 23 and the compartments 18 and 19 are separated by partitions 24 and 25 providing an area 26 for instruments associated with a control board 27. The wings 12 and 13 are also journaled in the area 26 with a shaft 28 of the wing 12 pivotally held in bearings 29 and 30, and a shaft 31 of the wing 13 held in bearings 32 and 33.

The adjustable ends of the wings are provided with arms 34 and 35 that extend through openings 36 and 37, respectively, in the sides of the body, and as illustrated in Figure 8, the arm 34 of the wing 12 is connected to a piston rod 38 of a piston 39 in a cylinder 40, and the arm 35 of the wing 13 is connected to a piston rod 41 of a piston 42 in a cylinder 43. The cylinders 40 and 43 are connected, as illustrated in Figure 6, to a master cylinder 44 having a piston 45 therein which is connected by a piston rod 46 to a hand lever 47 that is pivotally mounted on a pin 48 below a floor 49 in the compartment 19 in which a seat 50 is provided for an operator. The opposite ends of the master cylinder 44 are connected to the control cylinders 40 and 43 by connections 51 and 52, respectively, and the control cylinders are connected by a connection 53, whereby as the rear tip of one wing is elevated the corresponding tip of the other wing is lowered.

The brakes 14 and 15 are formed of segments, as shown in Figure 4, with the brake 14 pivotally mounted on a shaft 54, and the brake 15 pivotally mounted on a shaft 55. The brake 14 is provided with an arm 56 and the brake 15 with an arm 57 and the arms are connected by a rod 58 which is actuated by a piston rod 59 of a piston 60 in a cylinder 61. The cylinder 61 is connected to a control cylinder 62 with a connection 63 and the control cylinder 62 is provided with a piston 64 having a stem 65 with a foot pedal 66 thereon, whereby as the piston 64 is pressed downward it will force fluid through the connection 63 to the cylinder 61 and the piston 60 therein will actuate the brakes 14 and 15 to dig into the snow. The cylinder 61 is provided with a spring 67 that returns the piston and retracts the brakes when the foot pedal is released.

The propeller 16 may be connected to the motor 17 by any suitable power transmission means. In the design shown the motor drives a shaft 68 through gears 69 and 70 and the shaft 68 drives a propeller shaft 71 through gears 72 and 73, as shown in Figure 4.

The motor 17, fuel tank 22, and master cylinder 44 are positioned on a floor 74, and the compartment 19 is provided with a windshield 75 and a door 76. A partition 77 is provided between the compartments 18 and 20, and a partition 78 between the compartments 20 and 21. A safety guard 79 is also provided in front of the propeller 16.

The body 10 is mounted on the runner 11 by a relatively solid intermediate section 80, and the runner is provided with a tapering arcuate forward end 81 the thickness and width of which are gradually diminishing providing a springy section to take shocks and the like. The upper end 82 of the forward section of the runner is connected to the body by a bolt 83 having a spring 84 thereon, and similar connections are provided intermediate of the section 80 and the end with bolts 85 having springs 86 thereon. The runner is also provided with a rear section 87 that is also springy, and bolts 88 with springs 89 thereon connect the end of the section 87 to the body, as shown in Figure 4.

The under surface of the runner is provided with a centrally disposed longitudinally extending concave area 90, as shown in Figures 7 and 8, and heating coils 91 extend substantially throughout the length thereof. The intermediate portion of the runner is provided with wells 92 and 93 in which the brakes 14 and 15 are positioned, respectively.

With the parts arranged in this manner the snow sled may be operated efficiently and with safety over deep snow and uneven tracks at relatively high speed.

It will be understood that modifications may be made in the design and arrangement of the parts without departing from the spirit of the invention.

What is claimed is:

1. In a snow sled, the combination which comprises an elongated substantially hollow body having a flat base with extended longitudinally disposed flanges at the sides and having a longitudinally disposed concave recess in the under surface and positioned midway between the sides, said body having a housing substantially semicircular in cross section with vertically disposed sides spaced inwardly from the edges of the base, the forward end of said body having a conical shaped section extended therefrom forming a nose, the trailing end of said body having an arcuate upwardly sloping lower surface spaced from the base from a point substantially one-third of the length of the base, the trailing end of said base having an extended springy panel spaced from the under surface of the trailing end of the body and the forward end of the base being formed with an upwardly extended arcuate springy member extended around the forward end of the nose, said arcuate member on the forward end being separated from the body from a point substantially one-third of the length of the body, means associated with said body for limiting the separating movement of the arcuate springy member on the forward end from the body, other means associated with said body for limiting separating movement of the springy panel on the trailing end of the body from the body, and resilient means embodying coil springs secured between the said arcuate springy member, and extended springy panel, and adjoining surfaces of the body.

2. In a snow sled, the combination which comprises an elongated substantially hollow body having a flat base with extended longitudinally disposed flanges at the sides and having a longitudinally disposed concave recess in the under surface and positioned midway between the sides, said body having a housing substantially semicircular in cross section with vertically disposed sides spaced inwardly from the edges of the base, the forward end of said body having a conical shaped section extended therefrom forming a nose, the trailing end of said body having an arcuate upwardly sloping lower surface spaced from the base from a point substantially one-third of the length of the base, the trailing end of said base having an extended springy panel spaced from the under surface of the trailing end of the body and the forward end of the base being formed with an upwardly extended arcuate springy member extended around the forward end of the nose, said arcuate member on the forward end being separated from the body from a point substantially one-third of the length of the body, means associated with said body for limiting the separating movement of the arcuate springy member on the forward end from the body, other means associated with said body for limiting separating movement of the springy panel in the trailing end of the body from the body, resilient means embodying coil springs secured between the said arcuate springy member, and extended springy panel, an adjoining surfaces of the body, propelling means carried by the body and longitudinally disposed tubes for a heating agent extended through the said base of the body.

3. In a snow sled, the combination which comprises an elongated substantially hollow body having a flat base with extended longitudinally disposed flanges at the sides and having a longitudinally disposed concave recess in the under surface and positioned midway between the sides, said body having a housing substantially semicircular in cross section with vertically disposed sides spaced inwardly from the edges of the base, the forward end of said body having a conical shaped section extended therefrom forming a nose, the trailing end of said body having an arcuate upwardly sloping lower surface spaced from the base from a point substantially one-third of the length of the base, the trailing end of said base having an extended springy panel spaced from the under surface of the trailing end of the body and the forward end of the base being formed with an upwardly extended arcuate springy member extended around the forward end of the nose, said arcuate member on the forward end being separated from the body from a point substantially one-third of the length of the body, means associated with said body for limiting the separating movement of the arcuate springy member on the forward end from the body, other means associated with said body for limiting separating movement of the springy panel on the trailing end of the body from the body, resilient means embodying coil springs secured between the said arcuate springy member, and extended springy panel, and adjoining surfaces of the body, propelling means on the trailing end of the body, said base having vertically disposed openings extended therethrough, segments pivotally mounted in the base and positioned in the said vertically disposed openings, and means actuating the said segments to positions below the lower surface of the base for providing brakes for retarding forward movement of the sled.

4. In a snow sled, the combination which comprises an elongated substantially hollow body having a flat base with extended longitudinally disposed flanges at the sides and having a horizontally disposed concave recess in the under surface and positioned midway between the sides, said body having a housing substantially semicircular in cross section with vertically disposed sides spaced inwardly from the edges of the base, the forward end of said body having a conical shaped section extended therefrom forming a nose, the trailing end of said body having an arcuate upwardly sloping lower surface spaced from the base from a point substantially one-third of the length of the base, the trailing end of said base having an extended springy panel spaced from the under surface of the trailing end of the body and the forward end of the base being formed with an upwardly extended arcuate springy member extended around the forward end of the nose, said arcuate member on the forward end being separated from the body from a point substantially one-third of the length of the body, means associated with said body for limiting the separating movement of the arcuate springy member on the forward end from the body, other means associated with said body for limiting separating movement of the springy panel on the trailing end of the body from the body, resilient means embodying coil springs secured between the said arcuate springy member, and extended springy panel, and adjoining surfaces of the body, longitudinally disposed upwardly inclined wings pivotally mounted in and extended from the sides of the said body, and means actuating the said wings for steering the said body.

IGNATIUS JAMES CAPIAK.

REFERENCES CITED

The following references are of record in the file of this patent:

UNITED STATES PATENTS

| Number | Name | Date |
|---|---|---|
| 234,655 | Caldwell et al. | Nov. 23, 1880 |
| 342,215 | McCormick | May 18, 1886 |
| 1,816,118 | Knight | July 28, 1931 |
| 2,248,235 | Holden et al. | July 8, 1941 |
| 2,249,374 | Davis | July 15, 1941 |
| 2,276,310 | James | Mar. 17, 1942 |
| 2,340,558 | Porter | Feb. 1, 1944 |
| 2,369,832 | Klose | Feb. 20, 1945 |
| 2,400,782 | Randall | May 21, 1946 |
| 2,422,296 | Flader et al. | June 17, 1947 |

FOREIGN PATENTS

| Number | Country | Date |
|---|---|---|
| 36,663 | Sweden | Feb. 16, 1912 |
| 406,301 | France | Dec. 6, 1909 |